FIG. 3a
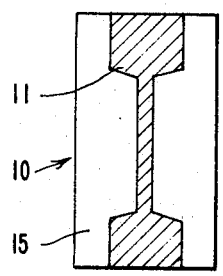
FIG. 3b
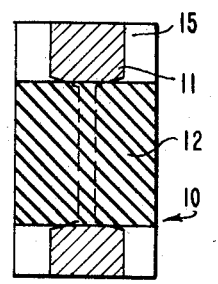
FIG. 3c
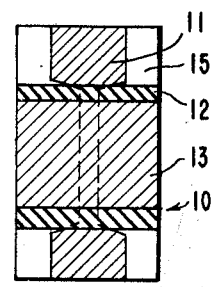
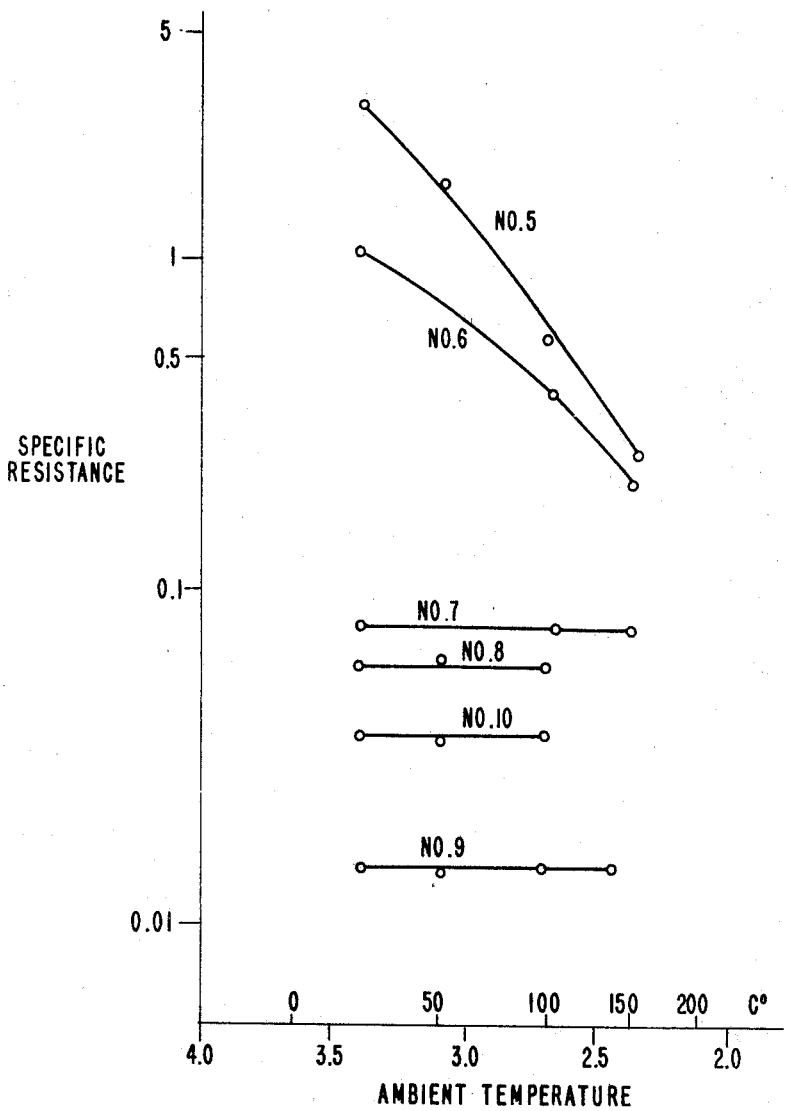
FIG. 1b

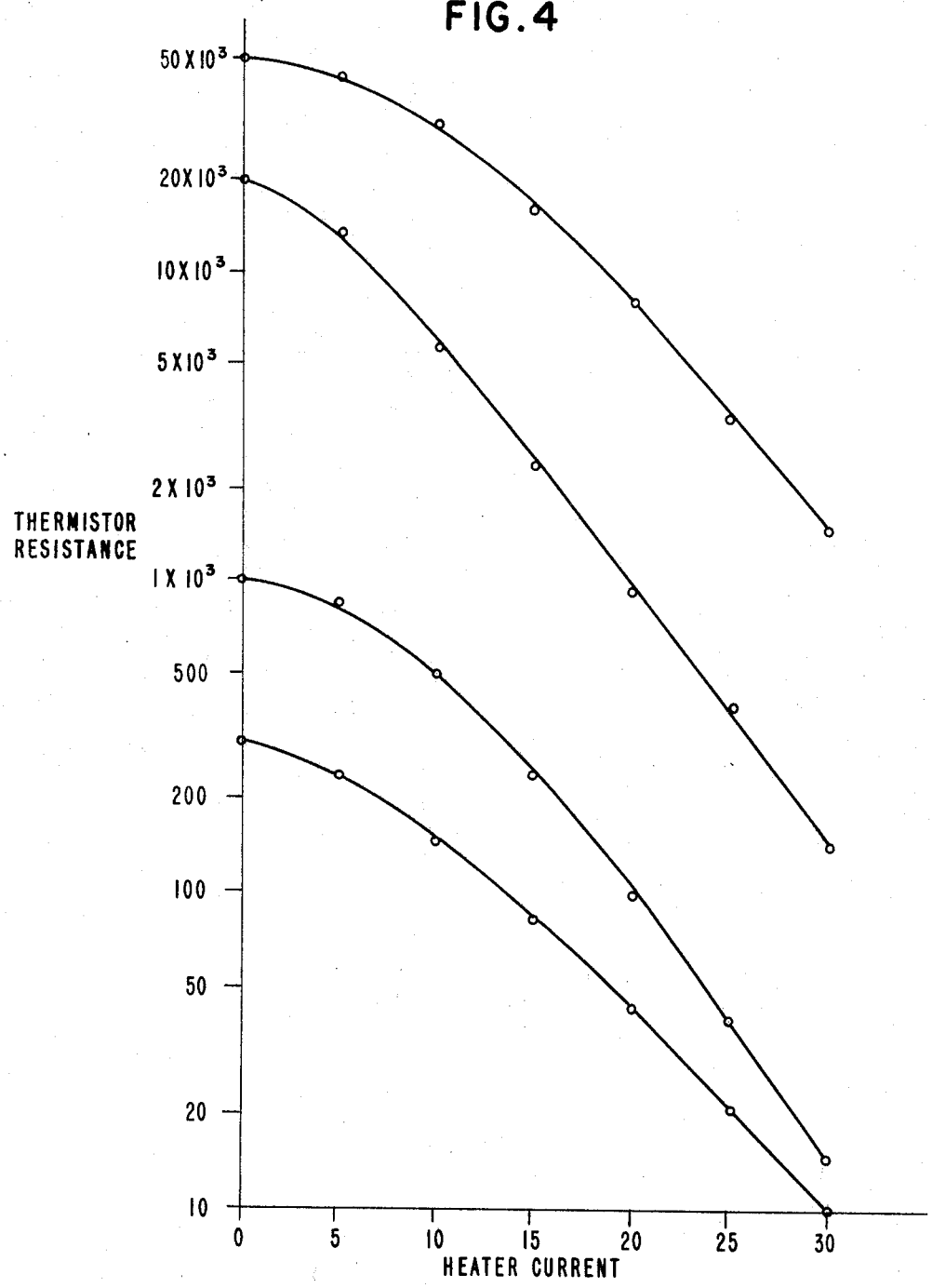

United States Patent Office 3,503,030
Patented Mar. 24, 1970

3,503,030
INDIRECTLY-HEATED THERMISTOR
Taro Matsumoto and Takeshi Shintani, Kawasaki-shi, Japan, assignors to Fujitsu Limited, Kawasaki, Japan, a corporation of Japan
Filed Nov. 6, 1967, Ser. No. 680,722
Claims priority, application Japan, Nov. 11, 1966, 41/74,130
Int. Cl. H01c 7/04, 7/10, 7/00
U.S. Cl. 338—23                                          4 Claims

ABSTRACT OF THE DISCLOSURE

Described is an indirectly-heated thermistor consisting essentially of a thermistor element, a heater for indirect heating and an insulating substrate. The thermistor is characterized in that the said thermistor element and the heater for indirect heating are composed of films formed by vacuum evaporation of an elemental semiconductor. The substrate temperature is maintained below the crystallization point of the element during the thermistor element formation, and above the crystallization point during the heater formation. When using germanium as the elemental semiconductor, the substrate is maintained at a temperature below 350° C. during the formation of the thermistor element and above 360° C. during the formation of the heater element.

---

Figure 2A:
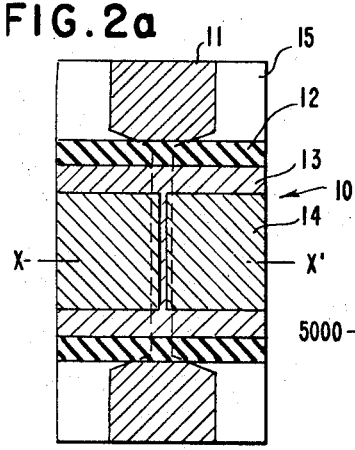

Our invention relates to an indirectly-heated thermistor and, more particularly, it relates to an indirectly-heated thermistor in which the thermistor element and the heater for indirect heating are composed of elemental semiconductor films made by vacuum evaporation under conditions different from each other.

A thermistor is an electric circuit component for detecting temperature change and is used in many electric circuits. Conventional thermistors are fabricated by mixing oxides of metals such as manganese, nickel, cobalt, copper, iron, magnesium, titanium and the like, and sintering the mixture at high temperatures.

This type of thermistors has disadvantages both in their fabrication and in their use.

The thermistor characteristics vary over a wide range depending on many factors such as mixing ratio of oxides, conditions, of mixtures, sintering temperature and time. Consequently, extremely high precision is required for mass production of thermistors having the required characteristics. Cracks and bubbles often appear in thermistors during sintering, whereby the temperature distribution in the thermistor becomes uneven. This unevenness results in higher harmonics of electric current further increasing the distortion ratio, rendering the product unable to meet the high level of high frequency characteristics required.

Also, in many applications a larger "thermal time constant" is required. The time constant is influenced by many factors such as the heat capacity of the main body which supports the thermistor element and is thermally connected thereto and its heat radiation coefficient. It is also closely related to the diameter of the electrode leads of the sintered thermistor element and the atmosphere surrounding the element. In order to make the time constant larger, therefore, electrode leads of small diameter are used. This obviously reduces the mechanical impact strength of the thermistor, particularly in bead-type thermistors in which the leads support the thermistor element.

Accordingly, one object of our invention is to provide an indirectly-heated thermistor having improved high frequency characteristics and mechanical strength.

Another object of the invention is to provide a simple process for fabricating indirectly-heated thermistors which have the desired characteristics. This is achieved by forming the thermistor element and the heater for indirect heating from films of an elemental semiconductor by vacuum evaporation.

According to the invention, the foregoing objects are achieved by composing the thermistor element and the resistive heater for indirectly heating the element from a thin film formed by vacuum evaporation of an elemental semiconductor. The thin films are formed on an insulating substrate by vacuum evaporation of an elemental semiconductor in such a manner that they can function as the thermistor element and the resistor.

A primary concept of the invention is in the use of thin films formed by vacuum evaporation of an elemental semiconductor as the thermistor element and the heater for indirect heating. Thus, a thermistor element film and a resistor film are formed on an insulating substrate. The films are electrically insulated, by an insulating intermediate made in the said film-forming procedure, or by an insulating substrate.

In this invention it is important that the thermistor is of vacuum evaporated film, by which it is made possible to impart the desired heat sensitive characteristics to the thermistor without deteriorating its high frequency characteristics. The temperature sensitive characteristics indicated by the thermistor constant are controlled by the temperature of the insulating substrate at the time of vacuum evaporation. The resistor is formed on the same substrate while maintained at even higher temperature.

Because the indirectly-heated thermistor is composed of vacuum evaporated film of an elemental semiconductor, optimum heat sensitive characteristics can be easily imparted thereto. This advantage is particularly conspicuous when both the thermistor element and the resistor are formed of the same semiconductor film.

Our invention will hereafter be explained with reference to a preferred embodiment. It is understood that the scope of the invention should by no means be limited to the preferred embodiment, because the invention relates essentially to the use of vacuum evaporated film in thermistors.

Figure 2B:
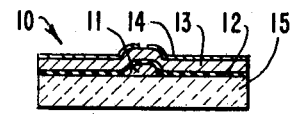
Figure 1A:
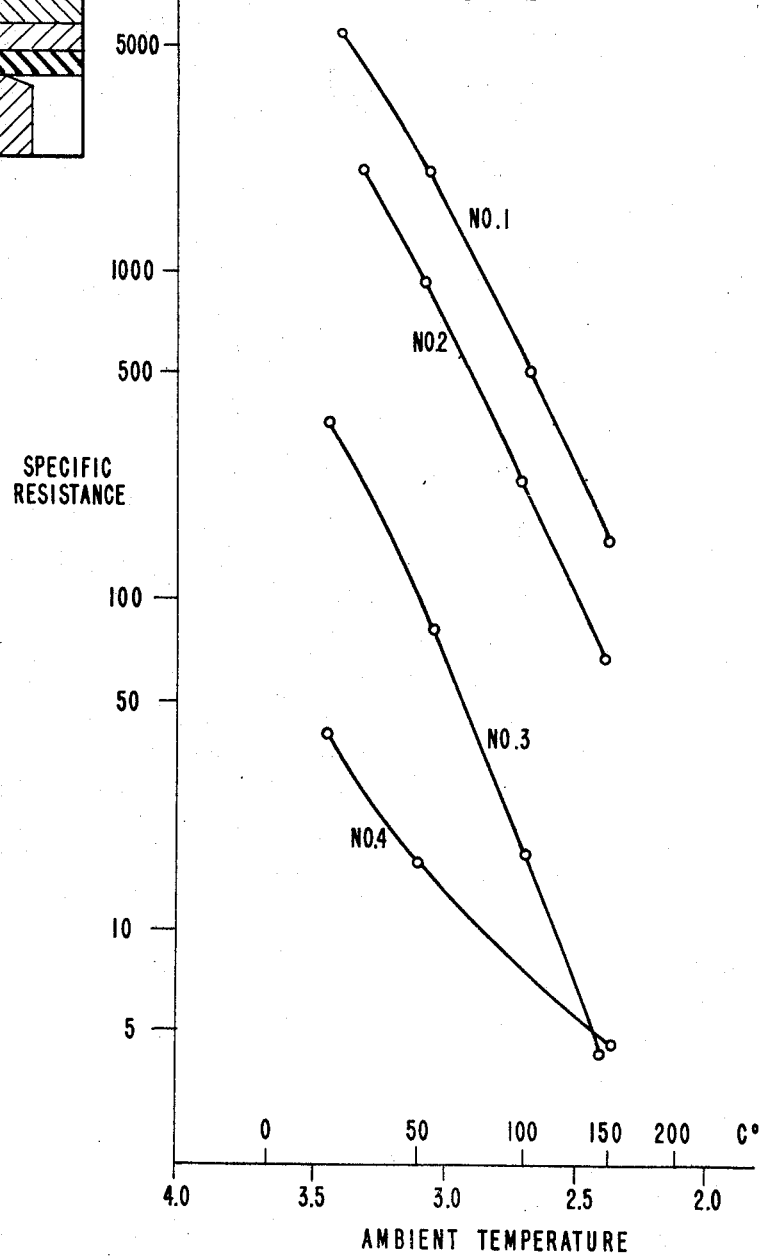

In the drawings,

FIGS. 1a and 1b shows specific resistance variation of the vacuum evaporated germanium films under temperature changes given in an experiment;

FIGS. 2a and 2b respectively shows a top and cross-sectional view of the indirectly-heated thermistor described as an embodiment of the invention;

FIGS. 3a, 3b and 3c sequentially illustrates the fabrication steps of the thermistor shown in FIG. 2; and FIG. 4 shows the variation in the resistance of the thermistor versus heater current.

According to our invention, an elemental semiconductor is deposited by means of vacuum evaporation on an insulating substrate of mica, glass, porcelain, and the like, or a conducting substrate coated with an insulating film, to form a thermistor element film and a resistor film. The films are separated and insulated by an insulating film formed by vacuum evaporation or sputtering of another insulating intermediate material, or by the insulating substrate. In the former case, the thermistor element and the resistor are laminated on the same surface of the substrate, and the thermal time constant of the thermistor becomes smaller. In the latter case, the thermistor element and the resistor are formed on each opposite side of the substrate, and the thermal time constant will become larger. The means of separation and insulation is not critical in this invention since it is not included in the essential features thereof.

The vacuum evaporation of the elemental semiconductor may be performed in any known vacuum evaporation apparatus. For instance, a crucible containing a block of an elemental semiconductor as the material to be evaporated is set in a lower portion within a vacuum chamber such as a glass bell-jar evacuated to at least $10^{-5}$ torr. An insulating substrate is placed above the crucible. Between the crucible and insulating substrate is a mask having openings through which the vapor should pass to deposit on the desired regions of the substrate. The material contained in the crucible is heated by means of resistance or an electron beam.

The surface of the insulating substrate is cleaned in advance, applying the conventional cleaning techniques in thin film circuit production. Of course, the surface should be reasonably smooth, because unevenness causes unstable properties of the film deposited thereon by means of vacuum evaporation. As previously mentioned, the material to be evaporated is heated to a temperature suitable for effecting vacuum evaporation.

The most typical of useful elemental semiconductors herein are germanium and silicon. Selenium, tellurium and carbon are also usable. Intrinsic crystalline germanium has a large temperature coefficient of resistance at 100°–200° C., and silicon at 200°–300° C. Within the temperature range most often utilized, the coefficient of silicon is less than that of germanium. Also vapor pressure of germanium at any given temperature is greater than that of silicon. Thus germanium is easier to vacuum evaporate. For this reason, germanium is preferred as the material for the thermistor element.

The mono- or polycrystalline semiconductor is subjected to vacuum evaporation in the accepted manner. When the temperature of the insulating substrate is constant under suitable evaporation source temperature, rate of vacuum evaporation and degree of vacuum, the specific resistance and thermistor constant of the film formed on the substrate by deposition of the vapor of the elemental semiconductor become substantially constant. Thus, by varying the temperature of the insulating substrate, the specific resistance and thermistor constant of the film can be varied as desired, the variation being particularly remarkable within a certain temperature range. Namely, the specific resistance and thermistor constant of the film formed on the substrate maintained below that temperature range are very high, and those of the film on the substrate maintained above that temperature range are very low. In other words, the specific resistance and thermistor constant values show both extremes with this temperature range as the switching point.

The temperature range includes the crystallizing temperature at which the composition of the vacuum evaporated film changes from non-crystalline state to polycrystalline state. The thermistor constant abruptly varies around the crystallizing temperature.

Researchers on the crystalline composition of the vacuum evaporated film of germanium were made by B. W. Sloop, C. O. Tiller and A. Pandsack. The former two employed electron diffraction and the last X-ray diffraction to prove respectively that the crystallizing temperature $Tc$ lies 300° C.$<Tc<$350° C. and 320° C.$<Tc<$400° C.

We also found that the thermistor constant varies with the temperature change of the insulating substrate. The variation is particularly conspicuous in the vicinity of the crystallizing point.

Examples of vacuum evaporation of germanium are as follows:

TABLE

| Sample No. | (a) Base substrate temp. (°C.) | (b) Evaporation source temp. (°C.) | (c) Rate of vacuum evaporation (A./sec.) | (d) Degree of vacuum ($\times 10^{-6}$ Torr) | (e) Film thickness ($\mu$) | (f) Distance between evaporation source and substrate (cm.) | (g) Vacuum evaporation time (min.) | (h) Specific resistance ($\Omega$ cm.) | (i) Thermistor constant (° K.) |
|---|---|---|---|---|---|---|---|---|---|
| 1 | 230 | 1,500 | 50 | 3.5 | 6 | 8.5 | 20 | 5,400 | 4,160 |
| 2 | 260 | 1,480 | 46 | 4 | 25 | 8 | 90 | 2,500 | 3,860 |
| 3 | 300 | 1,420 | 20 | 3 | 11 | 8 | 90 | 330 | 4,580 |
| 4 | 340 | 1,420 | 20 | 4 | 11 | 8 | 90 | 35 | 1,565 |
| 5 | 345 | 1,410 | 17 | 3 | 9 | 8 | 90 | 3 | 2,540 |
| 6 | 350 | 1,410 | 17 | 3 | 9 | 8 | 90 | 1.1 | 1,100 |
| 7 | 355 | 1,410 | 17 | 3 | 9 | 8 | 90 | 0.08 | 30 |
| 8 | 360 | 1,410 | 30 | 5 | 10 | 8 | 90 | 0.06 | ~0 |
| 9 | 400 | 1,500 | 33 | 4.5 | 8 | 10 | 40 | 0.015 | ~0 |
| 10 | 450 | 1,480 | 26 | 4 | 7 | 10 | 45 | 0.038 | ~0 |

In the above table, the specific resistance values were taken at 21° C., and the thermistor constants calculated at 100°–150° C. The thermistor constant B is defined as $$R_1 = R_2 \exp. B \left( \frac{1}{T_1} - \frac{1}{T_2} \right)$$

when the resistance values of the film at absolute temperatures $T_1$ and $T_2$ (° K.) are made, respectively, $R_1$ and $R_2$ ($\Omega$).

The specific resistance variations of the vacuum evaporated films, sample Nos. 1–10, corresponding to the ambient temperature change are shown in FIGS. 1a and 1b, the numerals in the figures corresponding to the sample number. In the graphs, the abscissa indicates the ambient temperature (° C.) and $10^3$/absolute temperature, and the ordinate the specific resistance ($\Omega \cdot$cm.). It should be apparent from these curves that sample Nos. 1–6 films show specific resistance variation with temperature change, but sample Nos. 7–10 films show substantially no such variation under similar temperature change.

The above table as well as the curves clearly show that the specific resistance and thermistor constant of vacuum evaporated germanium film vary in accordance with substrate temperature, with particularly abrupt variation around the crystallizing temperature, provided other evaporation conditions are maintained substantially constant. The table also indicates that the abrupt change in the thermistor constant of the germanium film takes place within 345°–355° C.

In case of vacuum evaporation of elemental semiconductors including germanium, when the substrate temperature is lower than the crystallization point, specific resistance and thermistor constant of the evaporated film are very high. In contrast, when the substrate temperature is relatively higher than the crystallization point, the said values of the film are considerably lower. It is upon this that our invention is based.

The film of the elemental semiconductor deposited at substrate temperatures below the crystallization point possesses thermistor characteristics, while that deposited at temperatures above this point does not. Therefore, the former constitutes a thermistor element, and the latter, a resistor. According to our invention, the elemental semiconductor is deposited at a temperature below the crystallization point on the insulating substrate to form a thermistor element, and is deposited at a temperature above the crystallization point to form a heater for indirect heating. The temperature of the substrate can be regulated by any substrate heating means conventionally employed in vacuum evaporation techniques. It is desirable that such a substrate heating apparatus be capable of precise temperature regulation over a wide temperature range.

The lower temperature limit of the insulating substrate in the formation of the thermistor element is determined with consideration for the adhering strength of the vacuum evaporated film. Again, the upper temperature limit in the formation of the heater for indirect heating should be determined, considering resistance temperature coefficient and thermal resistance of the substrate.

Other advantages of forming the heater from a polycrystalline semiconductor are that the control of vacuum evaporation is easy and electric current rating can be increased. That is, because nichrome films which are commonly used as resistors for thin film circuit have small specific resistance, on many occasions their films must be extremely thin, such as 50 A. for desired dimensions and resistance value. It is extremely difficult, therefore, to strictly control thickness of such thin films formed with present techniques of vacuum evaporation, and resistance of required precision can hardly be obtained. Whereas, semiconductors possess greater specific resistance compared with the said metals and, therefore, greater film thickness may be employed to yield the resistance with the required precision as well as to increase the allowable current.

The indirectly-heated thermistor film of the invention can be attached to the metallic stem used as transistor mount and the like with an adhesive, and sealed. The insulating substrate of the thermistor can be fixed with an adhesive resin.

One end of each of the electrode leads of the thermistor element and the heater for indirect heating is respectively connected to the electrode terminal containing the thermistor element and to the terminal of resistor. Thus the mechanical strength of the indirectly-heated thermistor becomes extremely great.

The thermal time constant of the thermistor is determined mainly by the heat capacity of the thermistor including fixing base, atmosphere, thermal conductivity and thickness of the insulator film which separates the thermistor element from the resistor, and the size of the electrode leads. Also the thermistor is not supported by the leads, but fixed on the supporting pedestal by suitable adhesive.

According to the invention, the resistance of thermistor element and thermistor constant can be optionally and easily controlled. This is an important advantage of this invention, since the control has been a problem which could not be solved by the conventional methods.

An indirectly-heated thermistor embodying the principle of our invention is shown in FIG. 2. FIG. 2a shows a top view of indirectly-heated thermistor 10 consisting of an insulating substrate 15, and a heater 11 for indirect heating, insulating film 12, a thermistor element 13, and electrode metal 14 which are laminated on the substrate. FIG. 2b is a cross-sectional view of the thermistor of FIG. 2a, cut along the line X–X'.

In practice, a plurality of such indirectly-heated thermistors are formed on an insulating substrate but, for simplicity, the explanation given here will be with respect to one thermistor unit.

First, an insulating substrate is subjected to suitable surface cleaning treatments. For this purpose, a hard glass sheet 15 of 0.3 mm. in thickness is supersonically cleaned for 10 minutes in trichloroethylene, rinsed twice in acetone for removal of the trichloroethylene from the sheet surfaces. The sheet is then supersonically cleaned for 10 minutes in ethyl alcohol and dried. An elemental semiconductor is deposited, by vacuum evaporation in a vacuum evaporation apparatus, upon the surface or surfaces of the glass sheet. Intrinsic polycrystalline or crystalline germanium is used as the evaporation source, is placed in a carbon crucible, and heated to about 1,500° C. with an alumina-coated tungsten resistance wire. The degree of vacuum in the vacuum chamber is maintained at $8$–$9 \times 10^{-6}$ torr. The vacuum evaporation of the semiconductor onto the glass substrate is performed through a metallic mask for 40 minutes, during which the glass substrate is maintained at 443° C. in order to form a heater for indirect heating. The heater formed is identified with the numeral 11 on FIG. 3a.

When germanium is used, as in the present case, the glass substrate temperature preferred is above the crystallization point of the element, for example above 360° C., but below 700° C. In FIG. 3a, the relatively wide area on the upper part is 1 mm. wide and 0.8 mm. long and serves as a terminal portion for the electrode leads. The relatively narrow and long portion in the center, in practice, functions as the heater and is 0.2 mm. in width. The film thickness is 10 $\mu$m. The heater is designed to offer a resistance of 200 ohms.

A chimney-type tantalum heater containing silicon monoxide is then heated to form an insulating film 12 in FIG. 3b. The degree of vacuum in the vacuum chamber is maintained at $3$–$5 \times 10^{-6}$ torr, and the glass substrate 15 is kept at a temperature of 340° C. The silicon monoxide is subjected to vacuum evaporation for 30 minutes through another metallic mask. The resultant film is 6 $\mu$m. in thickness.

This insulating film 12 insulates the heater 11 from the germanium film 13 which serves as a thermistor element in FIG. 3c to form the germanium film used as the thermistor element. The alumina-coated tungsten heater containing intrinsic polycrystalline germanium is again heated. The degree of vacuum in the vacuum chamber is maintained at $2 \times 10^{-6}$ torr, and the substrate temperature is 335° C. The germanium film 13 is formed to a thickness 20$\mu$ through another metallic mask. The film possesses a thermistor constant of 3000° K. The preferred glass substrate temperature ranges from 150° C. to a temperature below the crystallization point of the semiconductor, for example below 350° C. in case of germanium.

Next, in order to form the terminals for the electrode leads of the thermistor element 13, and also to determine the resistance of the thermistor, gold electrodes 14 are vacuum evaporated. This is seen in FIG. 2. In this embodiment, gold is deposited by vacuum evaporation to a thickness of 0.5 $\mu$m. through a metallic mask, providing a spacing of 30 $\mu$m. between the electrodes. During the evaporation, the glass sheet is maintained at 240° C.

FIG. 2a is a top view of one indirectly-heated thermistor unit formed by the above-described procedures. The glass sheet 15 is 2 mm. in width and 3.6 mm. in length.

The resistance of the thermistor element can be varied by suitable selection of the type of metallic mask applied in the vacuum evaporation of a metal electrode and regulating the temperature of the substrate at the time of evaporation of the thermistor element. The resistance variation is shown in FIG. 4, in which the abscissa denotes heater currents in milliampere, and the ordinate, thermistor resistance in ohm.

It is permissible to form an insulating coating of, for example, silicon monoxide, on the germanium film after forming the gold electrodes, in order to prevent oxidation of germanium. Indirectly-heated thermistor units divided from a large size glass sheet may be sealed to protect them from undesirable contamination. For the airtight sealing, a similar method to that employed in transistor fabrication may be applied. In that case, the adherence of the insulating substrate to the stem can be effected by various means. For example, use of a thermosetting adhesive resin will easily accomplish the desired adherence.

The foregoing descriptions only relate to one of many embodiments within the scope of this invention. While this invention has been described by means of a specific example, it is apparent that various changes and modifications can be made therein without departing from the inventive concept herein set forth. It should be understood that all of such changes and modifications are within the scope of this invention.

We claim:

1. An indirectly-heated thermistor consisting essentially of a thermistor element, a heater for indirect heating and an insulating substrate, both the thermistor element and the heater for indirect heating are composed of films formed by vacuum evaporation of germanium, the substrate temperature being maintained at a temperature below 350° C. during the thermistor element formation and above 360° C. during the heater formation.

2. An indirectly-heated thermistor comprising
(1) an insulating substrate;
(2) a thermistor element of noncrystalline germanium film having higher resistivity and high thermistor constant, said film being formed by vacuum evaporation wherein the substrate temperature is maintained below the crystallization point of the germanium; and
(3) a heater for indirectly heating said thermistor element, said heater being a lower resistivity crystalline germanium film formed by vacuum evaporation wherein the substrate temperature is maintained above the crystallization point of the germanium.

3. The indirectly-heated thermistor of claim 2, wherein an insulating film separates and insulates said thermistor element and said heater.

4. The method of making an indirectly-heated thermistor comprising an insulating substrate; a thermistor element of noncrystalline germanium film having higher resistivity and high thermistor constant; a heater for indirectly heating said thermistor element, said heater being a lower resistivity crystalline germanium film, which comprises forming the film for the thermistor element by vacuum evaporation with a substrate temperature below 350° C. and forming the heater with a substrate temperature above 360° C.

References Cited

UNITED STATES PATENTS

| 3,345,209 | 10/1967 | Cheroff et al. | 117—201 |
| 3,369,207 | 2/1968 | Hasegawa et al. | 338—23 |
| 3,406,366 | 10/1968 | Kontrimas et al. | 338—25 |

OTHER REFERENCES

R. P. Ruth et al.: Journal of Applied Physics, vol. 31, No. 6, June 1960, pp. 995–1000.

P. J. McDade: IBM Technical Disclosure Bulletin, vol. 2, No. 5, February 1960, p. 65.

D. J. C. Marinace: IBM Technical Disclosure Bulletin, vol. 5, No. 8, January 1963, p. 85.

REUBEN EPSTEIN, Primary Examiner

U.S. Cl. X.R.

29—612, 620; 117—107, 217; 338—24